(12) United States Patent
Eberlein et al.

(10) Patent No.: US 6,993,084 B1
(45) Date of Patent: Jan. 31, 2006

(54) COARSE FREQUENCY SYNCHRONISATION IN MULTICARRIER SYSTEMS

(75) Inventors: Ernst Eberlein, Grossenseebach (DE); Sabah Badri, Erlangen (DE); Stefan Lipp, Erlangen (DE); Stephan Buchholz, Munich (DE); Albert Heuberger, Erlangen (DE); Heinz Gerhaeuser, Waischenfeld (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/673,271

(22) PCT Filed: Apr. 14, 1998

(86) PCT No.: PCT/EP98/02169

§ 371 (c)(1),
(2), (4) Date: Nov. 28, 2000

(87) PCT Pub. No.: WO99/53665

PCT Pub. Date: Oct. 21, 1999

(51) Int. Cl.
*H04L 27/28* (2006.01)

(52) U.S. Cl. .................................................... 375/260
(58) Field of Classification Search ............... 375/132, 375/130, 135, 261, 326, 379, 295, 376, 324, 375/266, 268, 140, 260, 262, 271; 370/206, 370/517, 203, 204, 207, 208, 216, 343, 480, 370/210, 347, 510, 509, 470, 279, 209; 35/138
See application file for complete search history.

(56) References Cited

U.S. PATENT DOCUMENTS 5,191,576 A   3/1993   Pommier et al. ............. 370/18

5,550,812 A * 8/1996   Philips ........................ 370/203

(Continued)

FOREIGN PATENT DOCUMENTS

EP          0631406        12/1994

(Continued)

OTHER PUBLICATIONS

Moose, "A Technique for Orthogonal Frequency Division Multiplexing Frequency Offset Correction", *IEEE Transactions on Communications*, vol. 42, No. 10, pp. 2908-2914 (Oct. 1994).

(Continued)

*Primary Examiner*—Emmanuel Bayard
(74) *Attorney, Agent, or Firm*—Roylance, Abrams, Berdo & Goodman, L.L.P.

(57) ABSTRACT

A method for generating a signal having a frame structure, each frame of the frame structure comprising at least one useful symbol, a guard interval associated to the at least one useful symbol and a reference symbol, comprises the steps of performing an amplitude modulation of a bit sequence such that the envelope of the amplitude modulated bit sequence defines a reference pattern of the reference symbol and inserting the amplitude modulated bit sequence into said signal as said reference symbol. A method for frame synchronization of a signal having such a frame structure comprises the steps of receiving the signal, down-converting the received signal, performing an amplitude-demodulation of the down-converted signal in order to generate an envelope, correlating the envelope with a predetermined reference pattern in order to detect a signal reference pattern of the reference symbol in the signal, and performing the frame synchronization based on the detection of the signal reference pattern.

46 Claims, 3 Drawing Sheets

U.S. PATENT DOCUMENTS

| | | | | |
|---|---|---|---|---|
| 5,602,835 A | * | 2/1997 | Seki et al. | 370/206 |
| 5,631,610 A | * | 5/1997 | Sandberg et al. | 332/170 |
| 5,646,935 A | * | 7/1997 | Ishikawa et al. | 370/207 |
| 5,657,313 A | * | 8/1997 | Takahashi et al. | 370/491 |
| 5,694,389 A | * | 12/1997 | Seki et al. | 370/208 |
| 5,771,224 A | * | 6/1998 | Seki et al. | 370/206 |
| 5,832,387 A | * | 11/1998 | Bae et al. | 455/522 |
| 6,009,073 A | * | 12/1999 | Kaneko | 370/203 |
| 6,092,122 A | * | 7/2000 | Liu et al. | 709/227 |
| 6,151,296 A | * | 11/2000 | Vijayan et al. | 370/208 |
| 6,173,016 B1 | * | 1/2001 | Suzuki | 375/295 |
| 6,175,550 B1 | * | 1/2001 | van Nee | 370/206 |
| 6,359,933 B1 | * | 3/2002 | Aslanis et al. | 375/260 |
| 6,363,175 B1 | * | 3/2002 | Scheirer et al. | 382/232 |
| 6,687,315 B2 | * | 2/2004 | Keevill et al. | 375/341 |

FOREIGN PATENT DOCUMENTS

| | | |
|---|---|---|
| EP | 0722235 | 7/1996 |
| JP | 62502932 | 11/1987 |
| JP | 08251135 | 9/1996 |
| JP | 9116465 | 5/1997 |
| JP | 9214464 | 8/1997 |
| WO | 8607223 | 12/1986 |
| WO | 9800946 | 1/1998 |

OTHER PUBLICATIONS

Keller and Hanzo; "Orthogonal Frequency Division Multiplex synchronisation Techniques for Wireless Local Area Networks", *IEEE International Symposium on Personal, Indoor and Mobile Radio Communications*, pp. 963-967 (Oct. 1996).

Palacherla, "DSP-µP Routine Computes Magnitude", *EDN Electrical Design News*, vol. 34, No. 22, pp. 225-226 (Oct. 1989).

Warner and Leung, "OFDM/FM Frame Synchronization for Mobile Radio Data Communication", *IEEE Transactions On Vehicular Technology*, vol. 42, pp. 302-313 (Aug. 1993).

Classen and Meyr, "Synchronization Algorithms for an OFDM System for Mobile Communication", Condierung für Quelle, Kanal and Übertragung: ITG-Fachbericht, pp. 105-114 (Oct. 1994).

Schmidl and Cox, "Low-Overhead, Low-Complexity [Burst] Synchronization for OFDM", *Proc. IEEE Int. Conf. on Commun.*, pp. 1301-1306 (1996).

ver de Beek, Sandell, Isaksson and Börjesson, "Low-Complex Frame Synchronization in OFDM Systems", *Proc. of the ICUPC* (1995).

Lambrette, Horstmannshoff and Metr, "Techniques for Frame Synchronization on Unknown Frequency Selctive Channels", *Proc. Vehic. Technology Conference* (1997).

Zou and Wu, "COFDM: An Overview", *IEEE Transactions on Broadcasting*, vol. 41, No. 1, pp. 108 (Mar. 1995).

Adams and Brady, "Magnitude Approximations for Microprocessor Implementation", *IEEE Micro*, vol. 3, No. 5, pp. 27-31 (Oct. 1983).

Lambrette, Speth and Meyr, "OFDM Burst Frequency Synchronization by Single Carrier Training Data", *IEEE Cooun. Letters*, vol. 1, No. 2, pp. 46-48 (mar. 1997).

* cited by examiner

COARSE FREQUENCY SYNCHRONISATION IN MULTICARRIER SYSTEMS

FIELD OF THE INVENTION

The present invention relates to methods and apparatus for generating a signal having a frame structure, wherein each frame of the frame structure is composed of useful symbols, a guard interval associated to each useful symbol and one reference symbol. In addition, the present invention relates to methods and apparatus for frame synchronization of signals having the above structure.

The present invention is particularly useful in a MCM transmission system (MCM=Multi-carrier modulation) using an orthogonal frequency division multiplexing (OFDM) for digital broadcasting.

BACKGROUND OF THE INVENTION

In a MCM (OFDM) transmission system the binary information is represented in the form of a complex spectrum, i.e. a distinct number of complex subcarrier symbols in the frequency domain. In the modulator a bitstream is represented by a sequence of spectra. Using an inverse Fourier-transform (IFFT) a MCM time domain signal is produced from this sequence of spectra.

In case of a transmission of this described MCM signal via a multipath channel with memory, intersymbol interference (ISI) occurs due to multipath dispersion. To avoid ISI a guard interval of fixed length is added between adjacent MCM symbols in time. The guard interval is chosen as cyclic prefix. This means that the last part of a time domain MCM symbol is placed in front of the symbol to get a periodic extension. If the fixed length of the chosen guard interval is greater than the maximum multipath delay, ISI will not occur.

In the receiver the information which is in the frequency and time domain (MCM) has to be recovered from the MCM time domain signal. This is performed in two steps. Firstly, optimally locating the FFT window, thus eliminating the guard interval in front of each MCM time domain symbol. Secondly, performing a Fourier Transform of the sequence of useful time samples thus obtained.

As a result a sequence of spectral symbols is thus recovered. Each of the symbols contains a distinct number of information carrying subcarrier symbols. Out of these, the information bits are recovered using the inverse process of the modulator.

Performing the above described method, the following problem occurs in the receiver. The exact position of the guard interval and hence the position of the original useful parts of the time domain MCM symbols is generally unknown. Extraction of the guard interval and the subsequent FFT-transform of the resulting useful part of the time signal is not possible without additional information. To provide this additional information, a known (single carrier) sequence in the form of a (time domain) reference symbol is inserted into the time signal. With the knowledge about the positions of the reference symbols in the received signal, the exact positions of the guard intervals and thus the interesting information carrying time samples are known.

The periodical insertion of the reference symbol results in a frame structure of the MCM signal. This frame structure of a MCM signal is shown in FIG. 1. One frame of the MCM signal is composed of a plurality of MCM symbols 10. Each MCM symbol 10 is formed by an useful symbol 12 and a guard interval 14 associated therewith. As shown in FIG. 1, each frame comprises one reference symbol 16.

A functioning synchronization in the receiver, i.e. frame, frequency, phase, guard interval synchronization is necessary for the subsequent MCM demodulation. Consequently, the first and most important task of the base band processing in the receiver is to find and synchronize to the reference symbol.

DESCRIPTION OF THE PRIOR ART

Most prior art methods for frame synchronization have been developed for single carrier transmission over the AWGN channel (AWGN=Additive White Gaussian Noise). These prior art methods based on correlation are, without major changes, not applicable for transmission over multipath fading channels with large frequency offsets or MCM transmission systems that use, for example, an orthogonal frequency division multiplexing.

For MCM transmission systems particular frame synchronization methods have been developed.

Warner, W. D., Leung C.: OFDM/FM Frame Synchronization for Mobile Radio Data Communication, IEEE Trans. On Vehicular Technology, vol. VT-42, August 1993, pp. 302 to 313, teaches the insertion of reference symbols in the form of tones in parallel with the data into the MCM symbol. The reference symbols occupy several carriers of the MCM signal. In the receiver, the synchronization carriers are extracted in the frequency domain, after a FFT transform (FFT=fast Fourier transform) using a correlation detector. In the presence of large frequency offsets, this algorithm becomes very complex because several correlators must be implemented in parallel.

A further prior art technique is to insert a periodic reference symbol into the modulated MCM signal. This reference symbol is a CAZAC sequence (CAZAC=Constant Amplitude Zero Autocorrelation). Such techniques are taught by: Classen, F., Meyr, H.: Synchronization algorithms for an OFDM system *Vehic. Technology Conference*, 1997; Schmidl, T. M., Cox, D. C.: Low-Overhead, Low-Complexity [Burst] Synchronization for OFDM Transmission, *Proc. IEEE Int. Conf. on Commun.*, 1996. In such systems, the receiver's processor looks for a periodic repetition. For these algorithms coarse frequency synchronization has to be achieved prior to or at least simultaneously with frame synchronization.

Van de Beek, J, Sandell, M., Isaksson, M, Börjesson, P.: Low-Complex Frame Synchronization in OFDM Systems, *Proc. of the ICUPC*, 1995, avoid the insertion of additional reference symbols or pilot carriers and use instead the periodicity in the MCM signal which is inherent in the guard interval and the associated cyclical extension. This method is suitable only for slowly varying fading channels and small frequency offsets.

U.S. Pat. No. 5,191,576 relates to a method for the diffusion of digital data designed to be received notably by mobile receivers moving in an urban environment. In this method, the header of each frame of a broadcast signal having a frame structure has a first empty synchronization symbol and a second unmodulated wobbled signal forming a two-stage analog synchronization system. The recovery of the synchronization signal is achieved in an analog way, without prior extraction of a clock signal at the binary level.

EP 0631406 A relates to data signals, COFDM signals, for example, and to methods and apparatus for diffusing said signals. The COFDM signals comprises a sequence of symbols, each symbol having an useful portion and a guard interval. Two symbols of a COFDM signal are provided as synchronization symbols. One of the two symbols is a zero symbol, whereas the other thereof is a synchronization symbol which is formed by an unmodulated multiplex of the carrier frequencies having a constant envelope. Beside the two symbols as synchronization symbols, it is taught in EP 0631406 A to modulate the pilot frequency of the data signal with a reference signal which carries the synchronization information. This reference signal modulated on the pilot frequency of the data signal can be used by a MABLR demodulator.

WO 98/00946 A relates to a system for a timing and frequency synchronization of OFDM signals. Two OFDM training symbols are used to obtain full synchronization in less than two data frames. The OFDM training symbols are placed into the OFDM signal, preferably at least once every frame. The first OFDM training symbol is produced by modulating the even-numbered OFDM sub-carriers whereas the odd-numbered OFDM sub-carriers are suppressed. Thus, in accordance with WO 98/00946 A, the first OFDM training symbol is produced by modulating the even-numbered carriers of this symbol with a first predetermined PN sequence.

Moose: "A technique for orthogonal frequency division multiplexing frequency offset correction", IEEE TRANSACTIONS ON COMMUNICATIONS, Vo. 42, No. 10, October 1994, pages 2908 to 2914, teaches methods for correcting frequency offsets in OFDM digital communications. The methods involve repetition of a data symbol and comparison of the phases of each of the carriers between the successive symbols. The phase shift of each of the carriers between the repeated symbols is due to the frequency offset since the modulation phase values are not changed in the repeated symbols.

Keller; Hanzo: "Orthogonal frequency division multiplex synchronization techniques for wireless local area networks", IEEE INTERNATIONAL SYMPOSIUM ON PERSONAL, INDOOR AND MOBILE RADIO COMMUNICATIONS, Oct. 15, 1996, pages 963 to 967, teach frequency acquisition, frequency tracking, symbol synchronization and frame synchronization techniques. Regarding the frame synchronization, it is taught to use a reference symbol which consists of repetitive copies of a synchronization pattern of pseudo-random samples. The frame synchronization is achieved by autocorrelation techniques using the periodic synchronization segments such that for the synchronization algorithms proposed no a priori knowledge of the synchronization sequences is required.

The methods for frame synchronization available up to date require either prior achieved frequency synchronization or become very complex when the signal in the receiver is corrupted by a large frequency offset.

If there is a frequency offset in the receiver, as can easily be the case when a receiver is powered-on and the frequency synchronization loop is not yet locked, problems will occur. When performing a simple correlation there will only be noise at the output of the correlator, i.e. no maximum can be found if the frequency offset exceeds a certain bound. The size of the frequency offset depends on the length (time) of the correlation to be performed, i.e. the longer it takes, the smaller the allowed frequency offset becomes. In general, frequency offset increases implementation complexity.

Frequency offsets occur after power-on or later due to frequency deviation of the oscillators used for down-conversion to baseband. Typical accuracies for the frequency of a free running local oscillator (LO) are at ±50 ppm of the carrier frequency. With a carrier frequency in S-band (e.g. 2.34 GHz) there will be a maximum LO frequency deviation of above 100 kHz (117.25 kHz). A deviation of this magnitude puts high demands on the above methods.

In the case of multipath impaired transmission channel, a correlation method yields several correlation maxima in addition to the distinct maximum for an AWGN channel. The best possible frame header position, i.e. the reference symbol, has to be selected to cope with this number of maxima. In multipath channels, frame synchronization methods with correlations can not be used without major changes. Moreover, it is not possible to use data demodulated from the MCM system, because the demodulation is based on the knowledge of the position of the guard interval and the useful part of the MCM symbol.

SUMMARY OF THE INVENTION

It is an object of the present invention to provide a method and an apparatus for generating a signal having a frame structure that allow a frame synchronization after the signals have been transmitted even in the case of a carrier frequency offset or in the case of a transmission via a multipath fading channel.

It is a further object of the present invention to provide a method and an apparatus for frame synchronization of a signal having a frame structure even in the case of a carrier frequency offset.

In accordance with a first aspect, the present invention provides a method for generating a signal having a frame structure, each frame of the frame structure comprising at least one useful symbol, a guard interval associated to the at least one useful symbol and a reference symbol, the method comprising the steps of performing an amplitude modulation of a bit sequence, the envelope of the amplitude modulated bit sequence defining the reference pattern of the reference symbol and inserting the amplitude modulated bit sequence into said signal as said reference symbol.

In accordance with a second aspect, the present invention provides a method for generating a multi-carrier modulated signal having a frame structure, each frame of the frame structure comprising at least one useful symbol, a guard interval associated to the at least one useful symbol and a reference symbol, the method comprising the steps of:

providing a bitstream;

mapping bits of the bitstream to carriers in order to provide a sequence of spectra;

performing an inverse Fourier transform in order to provide multi-carrier modulated symbols;

associating a guard interval to each multi-carrier modulated symbol;

generating the reference symbol by performing an amplitude modulation of a bit sequence, the envelope of the amplitude modulated bit sequence defining the reference pattern of the reference symbol;

associating the reference symbol to a predetermined number of multi-carrier modulated symbols and associated guard intervals in order to define the frame; and inserting said amplitude modulated bit sequence into said signal as said reference symbol.

In accordance with a third aspect, the present invention provides a method for frame synchronization of a signal having a frame structure, each frame of the frame structure comprising at least one useful symbol, a guard interval associated with the at least one useful symbol and a reference symbol, the method comprising the steps of:

receiving the signal;

down-converting the received signal;

performing an amplitude-demodulation of the down-converted signal in order to generate an envelope;

correlating the envelope with a predetermined reference pattern in order to detect the signal reference pattern of the reference symbol in the signal; and performing the frame synchronization based on the detection of the signal reference pattern.

In accordance with a fourth aspect, the present invention provides a method for frame synchronization of a multi-carrier modulated signal having frame structure, each frame of the frame structure comprising at least one useful symbol, a guard interval associated to the at least one useful symbol and a reference symbol, the method comprising the steps of:

receiving the multi-carrier modulated signal;

down-converting the received multi-carrier modulated signal;

performing an amplitude-demodulation of the down-converted multi-carrier modulated signal in order to generate an envelope;

correlating the envelope with a predetermined reference pattern in order to detect the signal reference pattern of the reference symbol in the multi-carrier modulated signal;

performing the frame synchronization based on the detection of the signal reference pattern;

extracting the reference symbol and the at least one guard interval from the down-converted received multi-carrier modulated signal based on the frame synchronization;

performing a Fourier transform in order to provide a sequence of spectra from the at least one useful symbol;

de-mapping the sequence of spectra in order to provide a bitstream.

In accordance with a fifth aspect, the present invention provides an apparatus for generating a signal having a frame structure, each frame of the frame structure comprising at least one useful symbol, a guard interval associated to the at least one useful symbol and a reference symbol, the apparatus comprising an amplitude modulator for performing an amplitude modulation of a bit sequence, the envelope of the amplitude modulated bit sequence defining the reference pattern of the reference symbol; and means for inserting the amplitude modulated bit sequence into said signal as said reference symbol.

In accordance with a sixth aspect, the present invention provides an apparatus for generating a multi-carrier modulated signal having a frame structure, each frame of the frame structure comprising at least one useful symbol, a guard interval associated to the at least one useful symbol and a reference symbol, the apparatus comprising:

means for providing a bitstream;

means for mapping bits of the bitstream to carriers in order to provide a sequence of spectra;

means for performing an inverse Fourier transform in order to provide multi-carrier modulated symbols;

means for associating a guard interval to each multi-carrier modulated symbol;

means for generating the reference symbol by an amplitude modulator for performing an amplitude modulation of a bit sequence, the envelope of the amplitude modulated bit sequence defining the reference pattern of the reference symbol;

means for associating the reference symbol to a predetermined number of multi-carrier modulated symbols and associated guard intervals in order to define the frame; and means for inserting the amplitude modulated bit sequence into said signal as said reference symbol.

In accordance with a seventh aspect, the present invention provides an apparatus for frame synchronization of a signal having a frame structure, each frame of the frame structure comprising at least one useful symbol, a guard interval associated to the at least one useful symbol and a reference symbol, the apparatus comprising:

receiving means for receiving the signal;

a down-converter for down-converting the received signal;

an amplitude-demodulator for performing an amplitude demodulation of the down-converted signal in order to generate an envelope;

a correlator for correlating the envelope with a predetermined reference pattern in order to detect the signal reference pattern of the reference symbol in the signal; and means for performing the frame synchronization based on the detection of the signal reference pattern.

In accordance with a eighth aspect, the present invention provides an apparatus for frame synchronization of a multi-carrier modulated signal having a frame structure, each frame of the frame structure comprising at least one useful symbol, a guard interval associated to the at least one useful symbol and a reference symbol, the apparatus comprising:

a receiver for receiving the multi-carrier modulated signal;

a down-converter for down-converting the received multi-carrier modulated signal;

an amplitude-demodulator for performing an amplitude-demodulation of the down-converted multi-carrier modulated signal in order to generate an envelope;

a correlator for correlating the envelope with a predetermined reference pattern in order to detect the signal reference pattern of the reference symbol in the multi-carrier modulated signal;

means for performing the frame synchronization based on the detection of the signal reference pattern;

means for extracting the reference symbol and the at least one guard interval from the down-converted received multi-carrier modulated signal based on the frame synchronization in order to generate the at least one useful symbol;

means for performing a Fourier transform in order to provide a sequence of spectra from the at least one useful symbol; and means for de-mapping the sequence of spectra in order to provide a bitstream.

The present invention provides a novel structure of the reference symbol along with a method to determine the position of the reference symbol and thus the start of a frame in a signal having a frame structure as shown for example in FIG. 1.

The invention relates to a method for finding frame headers independently of other synchronization information and thus for positioning the FFT windows correctly. This includes the extraction of a guard interval. The method is based on the detection of a known reference symbol of the frame header in the reception signal, e.g. in the digital complex baseband. The new frame synchronization will be performed as the first synchronization task.

Synchronization to the reference symbol, i.e. the frame header is the first step to initiate radio reception. The reference symbol is structured to accomplish this. The information contained in the reference symbol must therefore be independent of other synchronization parameters, e.g. frequency offset. For this reason, in accordance with the present invention, the form of the reference symbol selected is an amplitude modulated sequence (AM sequence) in the complex baseband. Thus, the information contained in the reference symbol is only that given in the amplitude and not that in the phase. Note that the phase information will be corrupted by a possible frequency offset. In preferred embodiments of the present invention, the AM information is constructed from a bit sequence with special features. The information sequence is selected in a way which makes it easy and secure to find it in the time domain. A bit sequence with good autocorrelation properties is chosen. Good autocorrelation properties means a distinct correlation maximum in a correlation signal which should be as white as possible.

A pseudo random bit sequence (PRBS) having good autocorrelation properties meets the above requirements.

Using the envelope of the signal to carry bit information offers additional flexibility. First it has to be decided which envelope values should correspond to the binary values of 0 and 1. The parameters are mean amplitude and modulation rate. Attention should be paid to selecting the mean amplitude of the reference symbol (performance) identically to the mean amplitude of the rest of the frame. This is due to the amplitude normalization (AGC; AGC=Automatic Gain Control) performed in the receiver. It is also possible to select the mean amplitude of the reference symbol higher than the mean signal amplitude, but then care has to be taken that the time constant of the AGC (1/sensitivity) is selected high enough to secure that the strong (boosted) signal of the reference symbol does not influence the AGC control signal and thus attenuate the signal following the reference symbol.

Another degree of freedom can be characterized as modulation degree d. This parameter is responsible for the information density of the modulating signal mod(t) formed out of the binary sequence bin(t) as follows: mod(t)=bin(t/d). This modulation degree can be chosen as free parameter fixed by an integer or real relation to the sampling rate. It is appropriate to choose the modulation degree d as an integer value because of the discrete values of the binary sequence:

| | | |
|---|---|---|
| d = 1: mod (m) | = bin (m) | |
| d = 2: mod (m) | = bin (m/2) | for m even |
| | = bin_int (m/2) | for m odd |
| d = 3: mod (m) | = bin (m/3) | for m = 0, ±3, ±6, ±9, |
| | bin_int (m/3) | else |

The signal values bin_int(m/d) are computed from the binary sequence bin(m) by ideal interpolation (between the discrete integer values m) with the factor of d. This is similar to an ideal sampling rate expansion (with sin(x)/x interpolation), but the sampling rate remains, only less bits of the binary sequence bin(m) correspond to the resulting interpolated sequence mod(m). This parameter m indicates the discrete time.

With increasing m the modulating signal mod(t) is expanded in time relative to the basic binary sequence, this results in a bandwidth compression of the resulting AM spectrum with regard to the basic binary sequence. A time expansion by a factor 2 results in a bandwidth compression by the same factor 2. In addition to the bandwidth compression, a further advantage of a higher modulation degree d is a reduced complexity of the search method in the receiver due to the fact that only each dth sample has a corresponding binary value. Choosing the factor d=1 is not preferred since this would result in aliasing due to disregard of the sampling theorem. For this reason, in a preferred embodiment of the present invention d is chosen to be 2.

The choice of length and repetition rate of the reference symbol is, on the one hand, dominated by the channel properties, e.g. the channel's coherence time. On the other hand the choice depends on the receiver requirements concerning mean time for initial synchronization and mean time for resynchronization after synchronization loss due to a channel fade.

In the receiver, the first step after the down-conversion of the received signal is to perform an amplitude-demodulation of the down-converted signal in order to generate an envelope, i.e. in order to determine the amplitude of the signal. This envelope is correlated with a replica reference pattern in order to detect the signal reference pattern of the reference symbol in the signal. In the case of a AWGN channel, the result of this correlation will be a white noise signal with zero mean value and with a clearly visible (positive) maximum. In the case of a multipath channel, several maxima will occur in the correlation signal computed by this correlation. In the former case, the location of the reference symbol is determined based on the signal maximum, whereas in the latter case a weighting procedure is performed in order to find out the maximum corresponding to the location of the reference symbol.

Thus, the present invention shows how to find a reference symbol by a detection method which is simple. Furthermore, the present invention can be used for one-carrier or multi-carrier systems. The present invention is particularly useful in multi-carrier modulation systems using an orthogonal frequency division multiplexing, for example in the field of digital broadcasting. The synchronization methods according to the present invention are independent of other synchronization steps. Since the information needed for the synchronization is contained in the envelope of the preamble, i.e. the reference symbol, the reference symbol is independent of possible frequency offsets. Thus, a derivation of the correct down sampling timing and the correct positioning of the FFT window can be achieved. The reference symbol of the present invention can be detected even if the frequency synchronization loop is not yet locked or even in the case of a carrier frequency offset. The frame synchronization method in accordance with the present invention is preferably performed prior to other and without knowledge of other synchronization efforts.

BRIEF DESCRIPTION OF THE DRAWINGS

In the following, preferred embodiments of the present invention will be explained in detail on the basis of the drawings enclosed, in which.

DETAILED DESCRIPTION OF THE PREFERRED EMBODIMENTS

Although the present invention is explained mainly referring to a MCM system, it is obvious that the present invention can be used in connection with different signal transmissions that are based on different kinds of modulation.

Figure 2:
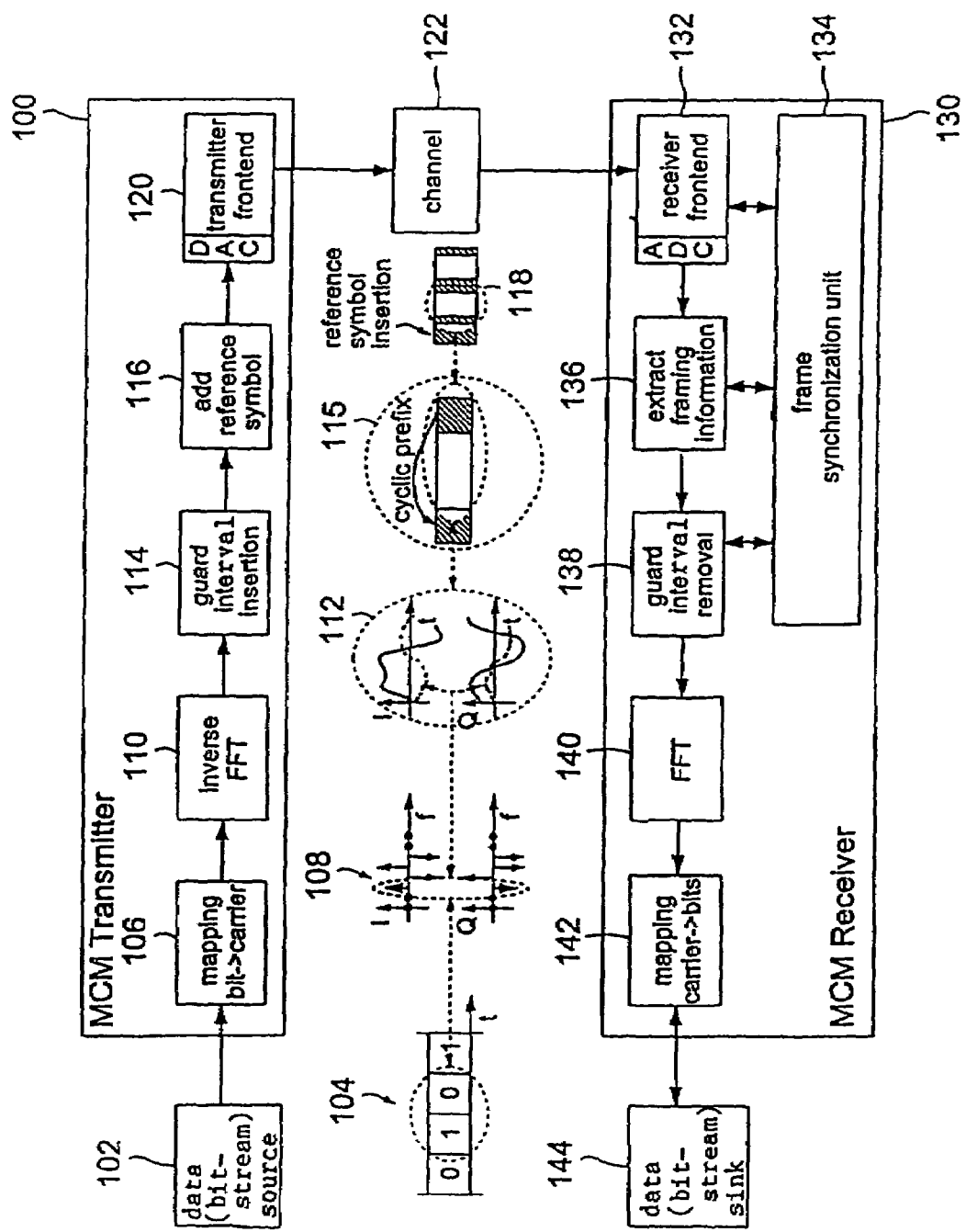
FIG. 2 shows a block diagram of a MCM system to which the present invention can be applied.

FIG. 2 shows a MCM system overview on the basis of which the present invention will be described in detail. At 100 a MCM transmitter is shown that substantially corresponds to a prior art MCM transmitter except for the kind of the reference symbol being added to each frame of a MCM signal. A description of such a MCM transmitter can be found, for example, in William Y. Zou, Yiyan Wu, "COFDM: AN OVERVIEW", IEEE Transactions on Broadcasting, vol. 41, No. 1, March 1995.

Figure 1:
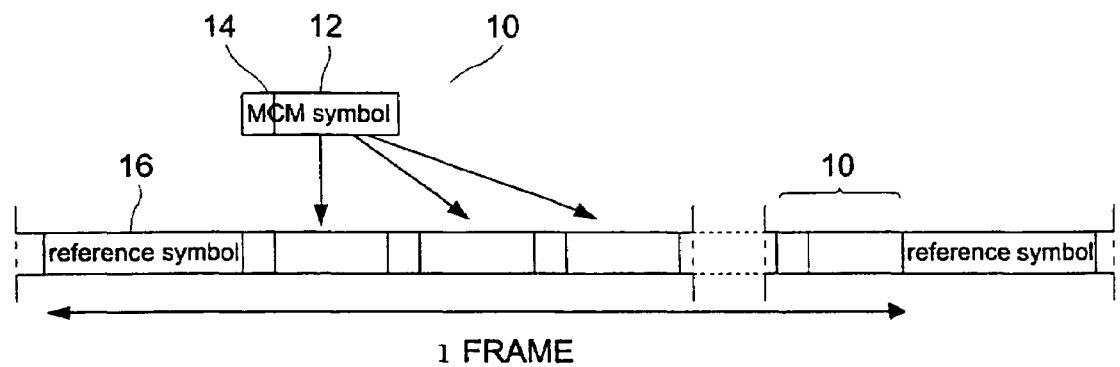
FIG. 1 shows a schematic view of a signal having a frame structure.
Figure 3:
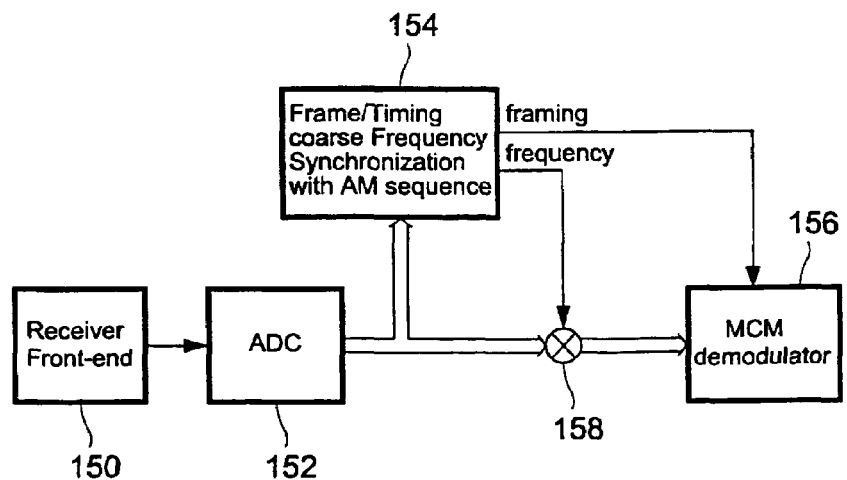
FIG. 3 shows a schematic block diagram of a frame and frequency synchronization system in a MCM receiver.

A data source 102 provides a serial bitstream 104 to the MCM transmitter. The incoming serial bitstream 104 is applied to a bit-carrier mapper 106 which produces a sequence of spectra 108 from the incoming serial bitstream 104. An inverse fast Fourier transform (FFT) 110 is performed on the sequence of spectra 108 in order to produce a MCM time domain signal 112. The MCM time domain signal forms the useful MCM symbol of the MCM time signal. To avoid intersymbol interference (ISI) caused by multipath distortion, a unit 114 is provided for inserting a guard interval of fixed length between adjacent MCM symbols in time. In accordance with a preferred embodiment of the present invention, the last part of the useful MCM symbol is used as the guard interval by placing same in front of the useful symbol. The resulting MCM symbol is shown at 115 in FIG. 2 and corresponds to the MCM symbol 10 depicted in FIG. 1. signal transmitted through the channel 122 is received at the receiver front end 132. The down-converted MCM signal is sampled at the receiver front end 132 and is, in the preferred embodiment, provided to a fast running automatic gain control (time constant<MCM symbol duration) in order to eliminate fast channel fluctuations (channel coherence time=MCM symbol duration). The fast AGC 162 is used in addition to the normally slow AGC in the signal path, in the case of transmission over a multipath channel with long channel impulse response and frequency selective fading. The fast AGC adjusts the average amplitude range of the signal to the known average amplitude of the reference symbol. The so processed symbol is provided to an amplitude determining unit 164.

The amplitude determining unit 164 can use the simple alpha$_{max+}$ beta$_{min-}$ method in order to calculate the amplitude of the signal. This method is described for example in Palachels A.: DSP-mP Routine Computes Magnitude, EDN, Oct. 26, 1989; and Adams, W. T., and Bradley, J.: Magnitude Approximations for Microprocessor Implementation, IEEE Micro, Vol. 3, No. 5, October 1983.

The output signal of the amplitude determining unit 164 is applied to a correlator 166. In the correlator 166, a cross correlation between the amplitude signal output from the amplitude determining unit 164 and a known ideal amplitude information is computed. The known ideal amplitude information is stored in the correlator. For both, the amplitude and the known ideal amplitude information, their amplitudes are symmetrically to zero relative to their average amplitude.

Figure 4:
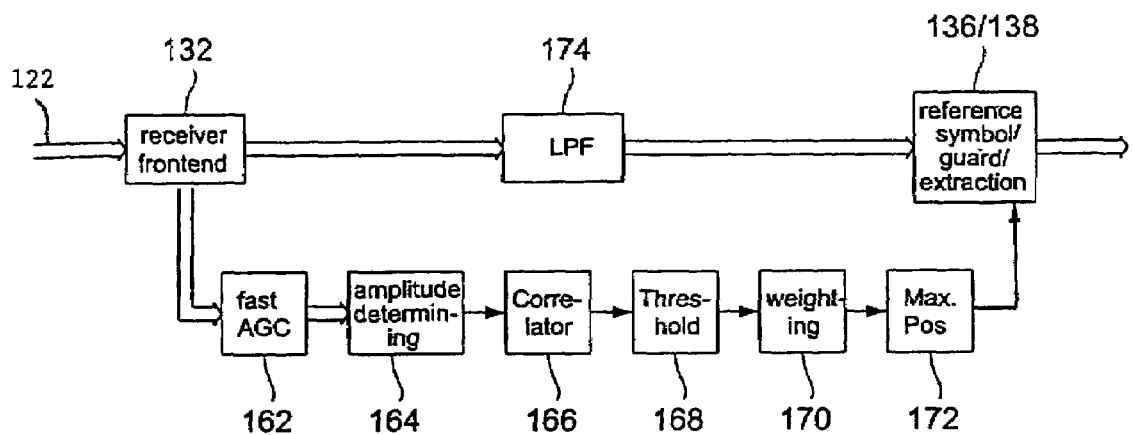
FIG. 4 shows a schematic diagram of an apparatus for frame synchronization.

In the ideal AWGN case, the result will be a white noise signal with zero mean value and with a clearly visible positive maximum. In this ideal AWGN case, the position of the single maximum is evaluated in a maximum position unit 172. On the basis of this evaluation, the reference symbol and the guard intervals are extracted from the MCM signal in a combined reference symbol/guard extraction unit 136/138. Although these units are shown as a combined unit 136/138 in FIG. 4, it is clear that separate units can be provided. The MCM signal is transmitted from the RF front end 150 to the reference symbol/guard extraction unit 136/138 via a low pass filter 174.

Figure 5:
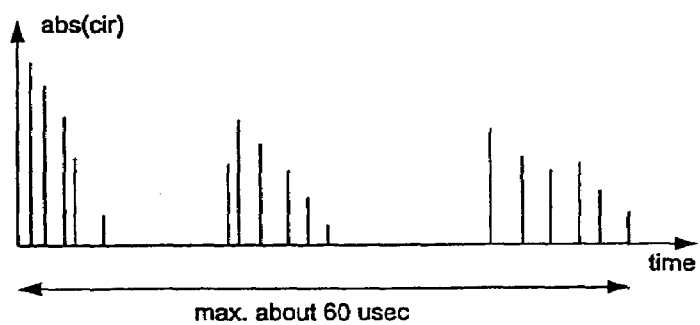
FIG. 5 shows a typical channel impulse response of a single frequency network in S-band.

In the case of time spreading encountered in a multipath channel, several maxima corresponding to the number of clusters in the channel impulse response occur in the output signal of the correlator. A schematic view of three such clusters located in a time window of maximum about 60 microseconds is shown in FIG. 5. Out of the several maxima caused by the time spreading encountered in a multipath channel, the best one has to be selected as the position of the frame header, i.e. the reference symbol. Therefore, a threshold unit 168 and a weighting unit 170 are provided between the correlator 166 and the maximum position unit 172. The threshold unit 168 is provided to remove maxima having an amplitude below a predetermined threshold. The weighting unit 164 is provided in order to perform a weighting procedure on the remaining maxima such that the maximum corresponding to the reference symbol can be determined. An examplary weighting procedure performed in the weighting unit 170 is as follows.

The first significant maximum is considered to be the best one. The output signal of the correlator is observed from the first detected maximum onwards for the maximum length of the channel impulse response and an amplitude weighting function is applied to the signal. Because the actual channel impulse response length is unknown, the following fact can be remembered. During system design, the length of the channel impulse response has to be investigated. In a MCM system, the guard interval shall be equal or longer than the maximum expected channel impulse response. For this reason, the part (interval with $l_I$ samples, $l_I$ corresponding to the maximum expected channel impulse response, i.e. the guard interval length) of the correlation output signal starting with the first maximum, $$I_{k0}(n) = r(k_0+n), \quad 0 \le n \le l_I - 1 \qquad \text{(Eq. 1)}$$

with $k_0$ being the position of the first maximum, will be examined to find the best frame start position. The above signal part is weighted with the function $$W(n) = 10^{-\frac{\text{weight\_dB}}{10} \cdot \frac{n}{l_I-1}} \qquad \text{(Eq. 2)}$$

The position ($n_{max}$) of the maximum in the resulting signal interval $$I_{k,weighted}(n) = [r(k_0+n)W(n)] = \left[ r(k_0+n) 10^{-\frac{\text{weight\_dB}}{10} \cdot \frac{n}{l_I-1}} \right] \qquad \text{(Eq. 3)}$$

$$0 \le n \le l_I - 1$$

will be chosen as best frame start position.

r(k) designates the output signal of the correlator (166) at the time k. The signal is present with a clock frequency which is determined by the multiplication: oversampling factor*subcarrier symbol frequency. The parameter k designates the discrete time in sample clocks. This signal is windowed with information from the threshold unit 168. An interval having the length of $l_I$ values is extracted from the signal r(k). The first value being written into the interval is the correlation start value at the time $k_0$, at which the output value $r(k_0)$ exceeds the threshold value of the threshold unit 168 for the first time. The interval with the windowed signal is designated by the term $I(k_0)$. The parameter n designates the relative time, i.e. position, of a value inside the interval.

Using the described weighting operation, the earlier correlation maxima are more likely to be chosen as right frame start position. A later coming maximum will only be chosen as frame start position, if the value of the maximum is significantly higher than the earlier one. This operation is applicable especially for MCM, because here it is better to detect the frame start positions some samples too early than some samples too late. Positioning the frame start some samples too early leads to positioning the FFT window a little bit into the guard interval, this contains information of the same MCM symbol and therefore leads to little effects. If the frame start position is detected some samples too late, then the FFT window includes some samples of the following guard interval.

This leads to a more visible degradation, because the following guard interval contains information of the following MCM symbol (ISI occurs).

It is important to know that the first visible correlation maximum after receiver power-on does not necessarily correspond to the first CIR (channel impulse response) cluster. It is possible that it is corresponding to a later cluster, see FIG. 5. For this reason during power-on one should wait for a second frame start before starting demodulation.

It is clear that amplitude determining methods different from the described $alpha_{max+}$ $beta_{min-}$ method can be used. For simplification, it is possible to reduce the amplitude calculation to a detection as to whether the current amplitude is above or below the average amplitude. The output signal then consists of a −1/+1 sequence which will be correlated with a known bit sequence, also in −1/+1 values. This correlation can easily be performed using a simple integrated circuit (IC).

In addition, an oversampling of the signal received at the RF front end can be performed. For example, the received signal can be expressed with two times oversampling.

This oversampled signal is passed to a fast running AGC to eliminate fast channel fluctuations before the amplitude of the signal is calculated. The amplitude information will be hard quantized. Values larger than the mean amplitude, mean amplitude is 1, will be expressed as +1, values smaller than the mean amplitude will be expressed as −1. This −1/+1 signal is passed to the correlator that performs a cross correlation between the quantized signal and the stored ideal amplitude values of the reference symbol:
amp_sto(k)=2*bin(k/4),
  if k=2(oversampling factor)*2(interpolation factor)* 1,2,3 . . . 92
  (92 for 184 reference symbol and interpolation factor 2)
amp_sto(k)=0, else, k<=2(oversampling factor)* plary
  weighting procedure performed in the weighting unit 170 is as follows.

The first significant maximum is considered to be the best one. The output signal of the correlator is observed from the first detected maximum onwards for the maximum length of the channel impulse response and an amplitude weighting function is applied to the signal. Because the actual channel impulse response length is unknown, the following fact can be remembered. During system design, the length of the channel impulse response has to be investigated. In a MCM system, the guard interval shall be equal or longer than the maximum expected channel impulse response. For this reason, the part (interval with lI samples, lI corresponding to the maximum expected channel impulse response, i.e. the guard interval length) of the correlation output signal starting with the first maximum, $$I_{k0}(n)=r(k_0+n),\ 0\# n\# l_I-1 \qquad (Eq.1)$$

with $k_0$ being the position of the first maximum, will be examined to find the best frame start position. The above signal part is weighted with the function $$W(n) = 10^{-\frac{weight\_dB}{10}\frac{n}{l_I-1}} \qquad (Eq.\ 2)$$

(Eq.2)

The position ($n_{max}$) of the maximum in the resulting signal interval $$I_{k0,weighted}(n) = [r(k_0+n)W(n)] = \left[r(k_0+n)10^{-\frac{weight\_dB}{10}\frac{n}{l_I-1}}\right] \qquad (Eq.\ 3)$$

$$0\ \#\ n\ \#\ l_I\ 1$$

(Eq.3)

will be chosen as best frame start position.

r(k) designates the output signal of the correlator (166) at the time k. The signal is present with a clock frequency which is determined by the multiplication: oversampling factor*subcarrier symbol frequency. The parameter k designates the discrete time in sample clocks. This signal is windowed with information from the threshold unit 168. An interval having the length of $l_I$ values is extracted from the signal r(k). The first value being written into the interval is the correlation start value at the time $k_0$, at which the output value $r(k_0)$ exceeds the threshold value of the threshold unit 168 for the first time. The interval with the windowed signal is designated by the term $I(k_0)$. The parameter n designates the relative time, i.e. position, of a value inside the interval.

Using the described weighting operation, the earlier correlation maxima are more likely to be chosen as right frame start position. A later coming maximum will only be chosen as frame start position, if the value of the maximum is significantly higher than the earlier one. This operation is applicable especially for MCM, because here it is better to detect the frame start positions some samples too early than some samples too late. Positioning the frame start some samples too early leads to positioning the FFT window a little bit into the guard interval, this contains information of the same MCM symbol and therefore leads to little effects. If the frame start position is detected some samples too late, then the FFT window includes some samples of the following guard interval. This leads to a more visible degradation, because the following guard interval contains information of the following MCM symbol (ISI occurs).

It is important to know that the first visible correlation maximum after receiver power-on does not necessarily correspond to the first CIR (channel impulse response) cluster. It is possible that it is corresponding to a later cluster, see FIG. 5. For this reason during power-on one should wait for a second frame start before starting demodulation.

It is clear that amplitude determining methods different from the described $alpha_+$ $beta_{min-}$ method can be used. For simplification, it is possible to reduce the amplitude calculation to a detection as to whether the current amplitude is above or below the average amplitude. The output signal then consists of a −1/+1 sequence which will be correlated with a known bit sequence, also in −1/+1 values. This correlation can easily be performed using a simple integrated circuit (IC).

In addition, an oversampling of the signal received at the RF front end can be performed. For example, the received signal can be expressed with two times oversampling.

This oversampled signal is passed to a fast running AGC to eliminate fast channel fluctuations before the amplitude of the signal is calculated. The amplitude information will be hard quantized. Values larger than the mean amplitude, mean amplitude is 1, will be expressed as +1, values smaller than the mean amplitude will be expressed as −1. This −1/+1 signal is passed to the correlator that performs a cross correlation between the quantized signal and the stored ideal amplitude values of the reference symbol:

amp_sto(k)=2*bin(k/4), if k=2(oversampling factor)*2(interpolation factor)* 1,2,3 . . . 92

(92 for 184 reference symbol and interpolation factor 2)

amp_sto(k)=0, else, k<=2(oversampling factor)

*2(interpolation factor)*92

(first part of amp_sto=[0 0 0 −1 0 0 0 1 0 0 0 1 0 0 0 −1 0 . . . ]).

With this algorithm a correlation maximum of 92 is achievable.

Again, the maxima in the correlator output signal correspond to different frame start positions due to different multipath clusters. In this signal with various maxima the best frame start position has to be chosen. This is done in the following steps: The output of the correlator is given to a threshold detection. If the signal first time exceeds the threshold (a threshold of 50 has proved to be applicable) the best position search algorithm is initialized. The correlator output signal in the interval following the threshold exceeding value will be weighted with the weighting function, see above. The position of the resulting maximum in the weighted signal will be chosen as best frame start position. With the knowledge about the best frame start position the guard interval extraction and the following MCM demodulation will be performed.

Some more efforts can be carried out to increase frame synchronization accuracy. These methods will be explained in the following.

A postprocessing of the frame start decision is performed in order a) to increase the reliability of the frame synchronization; b) to secure that no frame start position is disregarded; and c) to optimize the frame start position in case of varying CIR cluster positions.

Using information of other frame start positions. It is known that in front of each frame a reference symbol is inserted into the signal. If the position of the currently detected frame start has changed significantly regarding the last detected frame start, demodulation of the two frames in total and completely independent from each other is possible. It is also possible to buffer the last signal frame and to perform the required shift of the frame start position step by step with the MCM symbols of the frame. This results in an interpolative positioning of the single MCM symbols including simultaneous asynchronous guard interval extraction for the different MCM symbols.

Such an interpolative positioning of the FFT window is also possible if one frame start position is missing, i.e. the frame start has not been detected. If one frame start position is missing the guard interval extraction can be performed the same way as in the frame before without large performance degradation. This is due to the normally only slowly varying CIR cluster positions, but only if the signal strength is good enough. Stopping demodulation and waiting for the next detected frame start position is also imaginable but not desirable because of the long interrupt.

What follows is an example of a reference symbol of 184 samples (subcarrier symbols) as provided by the inventive apparatus for generating a signal having a frame structure.

The underlying binary sequence of length 92 is:

bin = [0 1 1 0 1 1 0 1 0 1 1 0 1 0 1 0
0 0 1 1 1 0 0 0 0 0 0 0 0 1 1 0
1 1 1 1 1 0 0 0 1 1 1 0 0 0 0 0
0 0 1 1 1 0 1 1 1 0 0 1 1 0 1 1
1 0 1 1 0 1 0 1 0 1 1 1 0 1 1 0 1
1 0 1 0 0 0 0 1 0 1 1 0]

The modulated binary sequence is:

i_q = [0.5 1.5 1.5 0.5 1.5 1.5 0.5 1.5 0.5 1.5 1.5 0.5 1.5
0.5 1.5 0.5 0.5 0.5 1.5 1.5 1.5 0.5 0.5 0.5 0.5 0.5
0.5 0.5 0.5 1.5 1.5 0.5 1.5 1.5 1.5 1.5 1.5 0.5 0.5
0.5 1.5 1.5 1.5 0.5 0.5 0.5 0.5 0.5 0.5 0.5 1.5 1.5
1.5 0.5 1.5 1.5 1.5 0.5 0.5 1.5 1.5 0.5 1.5 1.5 1.5
0.5 1.5 1.5 0.5 1.5 0.5 1.5 0.5 1.5 1.5 0.5 1.5 1.5
0.5 1.5 0.5 1.5 0.5 0.5 0.5 0.5 1.5 0.5 1.5 1.5 0.5]

This modulated binary sequence i_q is interpolated in order to produce an interpolated sequence i_q_int:

i_q_int = [0.5000 1.0635 1.5000 1.7195 1.5000 0.8706 0.5000
0.8571 1.5000 1.7917 1.5000 0.8108 0.5000 1.0392
1.5000 1.0392 0.5000 0.8108 1.5000 1.7984 1.5000
0.8108 0.5000 1.0460 1.5000 0.9997 0.5000 0.9603
1.5000 1.1424 0.5000 0.3831 0.5000 0.4293 0.5000
0.9997 1.5000 1.5769 1.5000 1.5769 1.5000 1.0065
0.5000 0.3899 0.5000 0.5325 0.5000 0.4931 0.5000
0.4999 0.5000 0.4931 0.5000 0.5325 0.5000 0.3967
0.5000 0.9603 1.5000 1.7522 1.5000 0.8571 0.5000
0.8965 1.5000 1.6422 1.5000 1.4669 1.5000 1.4737
1.5000 1.6096 1.5000 0.9929 0.5000 0.4226 0.5000
0.4226 0.5000 0.9997 1.5000 1.5769 1.5000 1.5769
1.5000 1.0065 0.5000 0.3899 0.5000 0.5325 0.5000
0.4931 0.5000 0.4931 0.5000 0.5325 0.5000 0.3899
0.5000 1.0065 1.5000 1.5701 1.5000 1.6096 1.5000
0.8965 0.5000 0.8965 1.5000 1.6096 1.5000 1.5633
1.5000 1.0392 0.5000 0.2867 0.5000 0.9929 1.5000
1.7454 1.5000 0.8571 0.5000 0.9033 1.5000 1.6028
1.5000 1.6028 1.5000 0.9033 0.5000 0.8503 1.5000
1.7917 1.5000 0.8108 0.5000 1.0460 1.5000 0.9929
0.5000 0.9929 1.5000 1.0460 0.5000 0.8108 1.5000
1.7917 1.5000 0.8571 0.5000 0.8571 1.5000 1.7849
1.5000 0.8571 0.5000 0.8571 1.5000 1.7917 1.5000
0.8176 0.5000 1.0065 1.5000 1.1424 0.5000 0.3436
0.5000 0.5788 0.5000 0.3436 0.5000 1.1424 1.5000
1.0065 0.8312 1.5000 1.7263 1.5000 1.0635 0.5000
0.0637]

amp_int=i_q_int+j*i_q_int amp_int is the reference symbol inserted periodically into the signal after the guard interval insertion.

As it is clear from the above specification, the present invention provides methods and apparatus for generating a signal having a frame structure and methods and apparatus for frame synchronization when receiving such signals which are superior when compared with prior art systems. The frame synchronization algorithm in accordance with the present invention provides all of the properties shown in Table 1 in contrary to known frame synchronization procedures. Table 1 shows a comparison between the system in accordance with the present invention using an AM sequence as reference symbol and prior art systems (single carrier and MCM Eureka 147).

TABLE 1

|  | Single carrier (e.g. QPSK like WS) | MCM Eureka 147 | MCM with AM sequence |
|---|---|---|---|
| Carrier offset allowed | no | yes | yes |
| Constant power achieved at Rx input | yes | no | yes |
| Coarse frequency offset estimation possible | no | no | yes |
| Coarse channel estimation possible (cluster estimation) | yes | no | yes |

As can be seen from Table 1 different synchronization tasks and parameters can be derived using the frame synchronization with an AM sequence in accordance with the present invention. The frame synchronization procedure MCM Eureka 147 corresponds to the procedure described in U.S. Pat. No. 5,191,576.

What is claimed is:

1. A method for generating a signal having a frame structure, each frame of said frame structure comprising at least one useful symbol, a guard interval associated to said at least one useful symbol and a reference symbol, said method comprising the step of performing an amplitude modulation of a bit sequence, an envelope of the amplitude modulated bit sequence defining a reference pattern of said reference symbol; and inserting, in time domain, the reference symbol into said signal, wherein said reference symbol comprises a real part and an imaginary part, said real part and said imaginary part being equal and being formed by said amplitude modulated bit sequence.

2. The method according to claim 1, wherein said signal is an orthogonal frequency division multiplexed signal.

3. The method according to claim 1, wherein said amplitude modulation is performed such that a mean amplitude of said reference symbol substantially corresponds to a mean amplitude of the remaining signal.

4. The method according to claim 1, wherein said bit sequence is a pseudo random bit sequence having good autocorrelation characteristics.

5. The method according to claim 1, wherein a number of useful symbols in each frame is defined depending on channel properties of a channel through which the signal or a multi-carrier modulated signal is transmitted.

6. A method for generating a multi-carrier modulated signal having a frame structure, each frame of said frame structure comprising at least one useful symbol, a guard interval associated to said at least one useful symbol and a reference symbol, said method comprising the steps of:

providing a bitstream;

mapping bits of said bitstream to carriers in order to provide a sequence of spectra;

performing an inverse Fourier transform in order to provide multi-carrier modulated symbols;

associating a guard interval to each multi-carrier modulated symbol;

generating said reference symbol by performing an amplitude modulation of a bit sequence, an envelope of the amplitude modulated bit sequence defining a reference pattern of said reference symbol;

associating said reference symbol to a predetermined number of multi-carrier modulated symbols and associated guard intervals in order to define said frame; and inserting, in time domain, said reference symbol into said signal, wherein said reference symbol comprises a real part and an imaginary part, said real part and said imaginary part being equal and being formed by said amplitude modulated bit sequence.

7. The method according to claim 6, wherein said multi-carrier modulated signal is an orthogonal frequency division multiplex signal.

8. The method according to claim 6, wherein said amplitude modulation is performed such that a mean amplitude of said reference symbol substantially corresponds to a mean amplitude of the remaining multi-carrier modulated signal.

9. A method for frame synchronization of a signal having a frame structure, each frame of said frame structure comprising at least one useful symbol, a guard interval associated with said at least one useful symbol and a reference symbol, said reference symbol comprising a real part and an imaginary part, said real part and said imaginary part being equal and being formed by an amplitude modulated bit sequence, said method comprising the steps of:

receiving said signal;

down-converting said received signal;

in time domain, performing an amplitude-demodulation of said down-converted signal in order to generate an envelope;

in time domain, correlating said envelope with a predetermined reference pattern in order to detect a signal reference pattern of said reference symbol in said signal; and performing said frame synchronization based on the detection of said signal reference pattern.

10. The method according to claim 9, further comprising the step of performing a fast automatic gain control of said received down-converted signal prior to the step of performing said amplitude-demodulation.

11. The method according to claim 9, wherein the step of performing said amplitude-demodulation comprises the step of calculating an amplitude of said signal using the $\alpha_{max+}$ $\beta_{min-}$ method.

12. The method according to claim 9, further comprising the steps of sampling respective amplitudes of said received down-converted signal and comparing said sampled amplitudes with a predetermined threshold in order to generate a bit sequence in order to perform said amplitude demodulation.

13. The method according to claim 12, wherein the step of sampling respective amplitudes of said received down-converted signal further comprises the step of performing an over-sampling of said received down-converted signal.

14. The method according to claim 9, further comprising the step of applying a result of the frame synchronization for a frame in said signal to at least one subsequent frame in said signal.

15. The method according to claim 9, further comprising the step of detecting a location of said signal reference pattern based on an occurrence of a maximum of a correlation signal when correlating said envelope with said predetermined reference pattern.

16. The method according to claim 15, further comprising the steps of:
weighting a plurality of maxima of said correlation signal such that a maximum occurring first is weighted stronger than any subsequently occurring maximum; and
detecting said location of said signal reference pattern based on the greatest one of said weighted maxima.

17. The method according to claim 16, further comprising the step of:
disabling the step of performing said frame synchronization for a predetermined period of time after having switched-on a receiver performing said method for frame synchronization.

18. A method for frame synchronization of a multi-carrier modulated signal having frame structure, each frame of said frame structure comprising at least one useful symbol, a guard interval associated to said at least one useful symbol and a reference symbol, said reference symbol comprising a real part and an imaginary part, said real part and said imaginary part being equal and being formed by an amplitude modulated bit sequence, said method comprising the steps of:
receiving said multi-carrier modulated signal;
down-converting said received multi-carrier modulated signal;
in time domain, performing an amplitude-demodulation of said down-converted multi-carrier modulated signal in order to generate an envelope;
in time domain, correlating said envelope with a predetermined reference pattern in order to detect a signal reference pattern of said reference symbol in said multi-carrier modulated signal;
performing said frame synchronization based on the detection of said signal reference pattern;
extracting said reference symbol and said at least one guard interval from said down-converted received multi-carrier modulated signal based on said frame synchronization;
performing a Fourier transform in order to provide a sequence of spectra from said at least one useful symbol; and
de-mapping said sequence of spectra in order to provide a bitstream.

19. The method according to claim 18, further comprising the step of performing a fast automatic gain control of said received down-converted multi-carrier modulated signal prior to the step of performing said amplitude-demodulation.

20. The method according to claim 18, wherein the step of performing said amplitude-demodulation comprises the step of calculating an amplitude of said multi-carrier modulated signal using the $\text{alpha}_{max+} \text{ beta}_{min-}$ method.

21. The method according to claim 18, further comprising the steps of sampling respective amplitudes of said received down-converted multi-carrier modulated signal and comparing said sampled amplitudes with a predetermined threshold in order to generate a bit sequence in order to perform said amplitude demodulation.

22. The method according to claim 21, wherein the step of sampling respective amplitudes of said received down-converted multi-carrier modulated signal further comprises the step of performing an over-sampling of said received down-converted multi-carrier modulated signal.

23. The method according to claim 18, further comprising the step of applying a result of the frame synchronization for a frame in said signal to at least one subsequent frame in said multi-carrier modulated signal.

24. An apparatus for generating a signal having a frame structure, each frame of said frame structure comprising at least one useful symbol, a guard interval associated to said at least one useful symbol and a reference symbol, said apparatus comprising:
an amplitude modulator for performing an amplitude modulation of a bit sequence, an envelope of the amplitude modulated bit sequence defining a reference pattern of said reference symbol; and
means for inserting, in time domain, the reference symbol into said signal, wherein said reference symbol comprises a real part and an imaginary part, said real part and said imaginary part being equal and being formed by said amplitude modulated bit sequence.

25. The apparatus according to claim 24, wherein said signal is an orthogonal frequency division multiplexed signal.

26. The apparatus according to claim 24, wherein a mean amplitude of said reference symbol substantially corresponds to a mean amplitude of the remaining signal.

27. The apparatus according to claim 24, comprising means for determining a number of useful symbols in each frame depending on channel properties of a channel through which the signal or a multi-carrier modulated signal is transmitted.

28. An apparatus for generating a multi-carrier modulated signal having a frame structure, each frame of said frame structure comprising at least one useful symbol, a guard interval associated to said at least one useful symbol and a reference symbol, said apparatus comprising:
means for providing a bitstream;
means for mapping bits of said bitstream to carriers in order to provide a sequence of spectra;
means for performing an inverse Fourier transform in order to provide multi-carrier modulated symbols;
means for associating a guard interval to each multi-carrier modulated symbol;
means for generating said reference symbol comprising an amplitude modulator for performing an amplitude modulation of a bit sequence, an envelope of the amplitude modulated bit sequence defining a reference pattern of said reference symbol;
means for associating said reference symbol to a predetermined number of multi-carrier modulated symbols and associated guard intervals in order to define said frame; and
means for inserting, in time domain, the reference symbol into said signal, wherein said reference symbol comprises a real part and an imaginary part, said real part and said imaginary part being equal and being formed by said amplitude modulated bit sequence.

29. The apparatus according to claim 28, wherein said multi-carrier modulated signal is an orthogonal frequency division multiplex signal.

30. The apparatus according to claim 28, wherein said means for generating said reference symbol performs the amplitude modulation such that a mean amplitude of said reference symbol substantially corresponds to a mean amplitude of the remaining multi-carrier modulated signal.

31. The apparatus according to claim 28, wherein said means for generating said reference symbol generates a pseudo random bit sequence having good autocorrelation characteristics as said bit sequence.

32. An apparatus for frame synchronization of a signal having a frame structure, each frame of said frame structure comprising at least one useful symbol, a guard interval associated to said at least one useful symbol and a reference symbol, said reference symbol comprising a real part and an imaginary part, said real part and said imaginary part being equal and being formed by an amplitude modulated bit sequence, said apparatus comprising:
    receiving means for receiving said signal;
    a down-converter for down-converting said received signal;
    an amplitude-demodulator for performing, in time domain, an amplitude demodulation of said down-converted signal in order to generate an envelope;
    a correlator for correlating, in time domain, said envelope with a predetermined reference pattern in order to detect a signal reference pattern of said reference symbol in said signal; and
    means for performing said frame synchronization based on the detection of said signal reference pattern.

33. The apparatus according to claim 32, further comprising means for performing a fast automatic gain control of said received down-converted signal preceding said amplitude-demodulator.

34. The apparatus according to claim 32, wherein said amplitude-demodulator comprises means for calculating an amplitude of said signal using the $alpha_{max+}$ $beta_{min-}$ method.

35. The apparatus according to claim 32, further comprising means for sampling respective amplitudes of said received down-converted signal, wherein said amplitude-demodulator comprises means for comparing said sampled amplitudes with a predetermined threshold in order to generate a bit sequence.

36. The apparatus according to claim 35, wherein said means for sampling comprises means for over-sampling said received down-converted signal.

37. The apparatus according to claim 32, further comprising means for applying a result of the frame synchronization for a frame in said signal to at least one subsequent frame in said signal.

38. The apparatus according to claim 32, further comprising means for detecting a location of said signal reference pattern based on an occurrence of a maximum of a correlation signal output of said correlator.

39. The apparatus according to claim 38, further comprising means for weighting a plurality of maxima of said correlation signal such that a maximum occurring first is weighted stronger than any subsequently occurring maximum; and
    means for detecting said location of said signal reference pattern based on the greatest one of said weighted maxima.

40. The apparatus according to claim 39, further comprising means for disabling said means for performing said frame synchronization for a predetermined period of time after having switched-on a receiver comprising said apparatus for frame synchronization.

41. An apparatus for frame synchronization of a multi-carrier modulated signal having a frame structure, each frame of said frame structure comprising at least one useful symbol, a guard interval associated to said at least one useful symbol and a reference symbol, said reference symbol comprising a real part and an imaginary part, said real part and said imaginary part being equal and being formed by an amplitude modulated bit sequence,
    said apparatus comprising:
    a receiver for receiving said multi-carrier modulated signal;
    a down-converter for down-converting said received multi-carrier modulated signal;
    an amplitude-demodulator for performing, in the time domain, an amplitude-demodulation of said down-converted multi-carrier modulated signal in order to generate an envelope;
    a correlator for correlating, in the time domain, said envelope with a predetermined reference pattern in order to detect a signal reference pattern of said reference symbol in said multi-carrier modulated signal;
    means for performing said frame synchronization based on the detection of said signal reference pattern;
    means for extracting said reference symbol and said at least one guard interval from said down-converted received multi-carrier modulated signal based on said frame synchronization in order to generate said at least one useful symbol;
    means for performing a Fourier transform in order to provide a sequence of spectra from said at least one useful symbol; and
    means for de-mapping said sequence of spectra in order to provide a bitstream.

42. The apparatus according to claim 41, further comprising means for performing a fast automatic gain control of said received down-converted multi-carrier modulated signal preceding said amplitude-demodulator.

43. The apparatus according to claim 41, wherein said amplitude-demodulator comprises means for calculating an amplitude of said multi-carrier modulated signal using the $alpha_{max+}$ $beta_{min-}$ method.

44. The apparatus according to claim 41, further comprising means for sampling respective amplitudes of said received down-converted multi-carrier modulated signal, wherein said amplitude-demodulator comprises means for comparing said sampled amplitudes with a predetermined threshold in order to generate a bit sequence.

45. The apparatus according to claim 44, wherein said means for sampling comprises means for over-sampling said received down-converted multi-carrier modulated signal.

46. The apparatus according to claim 41, further comprising means for applying a result of the frame synchronization for a frame in said multi-carrier modulated signal to at least one subsequent frame in said multi-carrier modulated signal.

* * * * *